(12) United States Patent
Mills

(10) Patent No.: US 11,565,823 B2
(45) Date of Patent: Jan. 31, 2023

(54) SYSTEMS AND METHODS OF RETROFITTING AN AIRCRAFT ENGINE TO AN AIRCRAFT

(71) Applicant: AERO INNOVATIONS LLC, Terre Haute, IN (US)

(72) Inventor: James M. Mills, Terre Haute, IN (US)

(73) Assignee: Aero Innovations, LLC, Terre Haute, IN (US)

( * ) Notice: Subject to any disclaimer, the term of this patent is extended or adjusted under 35 U.S.C. 154(b) by 0 days.

(21) Appl. No.: 17/099,145

(22) Filed: Nov. 16, 2020

(65) Prior Publication Data

US 2021/0171210 A1 Jun. 10, 2021

Related U.S. Application Data

(63) Continuation-in-part of application No. 16/846,877, filed on Apr. 13, 2020.

(60) Provisional application No. 62/936,060, filed on Nov. 15, 2019.

(51) Int. Cl.
| | | |
|---|---|---|
| *B64D 27/26* | (2006.01) | |
| *B64D 27/14* | (2006.01) | |
| *B64D 35/02* | (2006.01) | |
| *B64D 45/00* | (2006.01) | |

(52) U.S. Cl.
CPC ............. *B64D 27/26* (2013.01); *B64D 27/14* (2013.01); *B64D 35/02* (2013.01); *B64D 2027/262* (2013.01); *B64D 2045/0085* (2013.01); *B64D 2221/00* (2013.01)

(58) Field of Classification Search
CPC .. B64D 27/26; B64D 2027/262; B64D 27/10; B64D 27/12; B64D 27/14
See application file for complete search history.

(56) References Cited

U.S. PATENT DOCUMENTS

| | | |
|---|---|---|
| 2016/0376015 A1 | 12/2016 | Lacko |
| 2020/0324907 A1 | 10/2020 | Mills |

FOREIGN PATENT DOCUMENTS

FR    3039824 A1    2/2017

OTHER PUBLICATIONS

"Donald's Web Site" (Sak) Aug. 26, 2011; <URL:http://www.mykitlog.com/users/index.php?user+donsak&project+1979>.
"Our Story" (Cascade Aircraft conversions) Feb. 11, 2018 <URL:http://www.facebook.com/notes/1865052986845819/>.
"Aircraft Maintenance Manual Single Cockpit and dual Cockpit Model S24-T-660" (Thrush Aircraft Inc.) May 8, 2005.
"Type Certificate Data Sheet Thrush S2R" (EASA) Dec. 15, 2017.
Patent Cooperation Treaty, International Search Report; PCT/ISA/210; dated Mar. 12, 2021.

*Primary Examiner* — Timothy D Collins
*Assistant Examiner* — Eric Acosta
(74) *Attorney, Agent, or Firm* — Pitts & Lake, P.C.

(57) ABSTRACT

A system and method of converting engines on a turboprop aircraft, including removing an existing engine and associated propeller from an aircraft fuselage, installing an engine mount adapter assembly to the fuselage, and installing a replacement engine to the engine mount adapter assembly, whereby at least some portions of the replacement engine are attached to the engine mount adapter assembly for structural support.

14 Claims, 10 Drawing Sheets

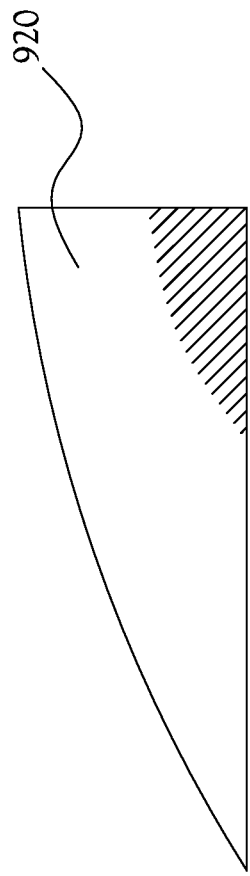
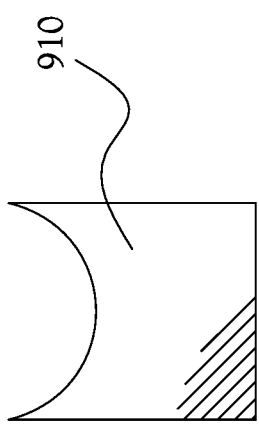
Fig.9a
Fig.9b
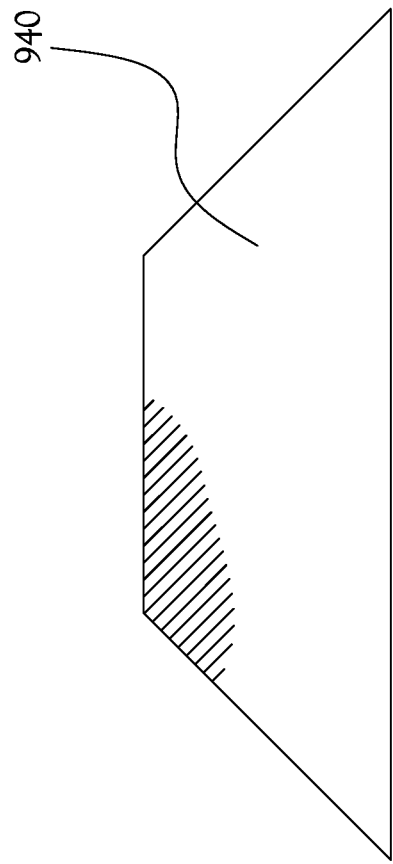
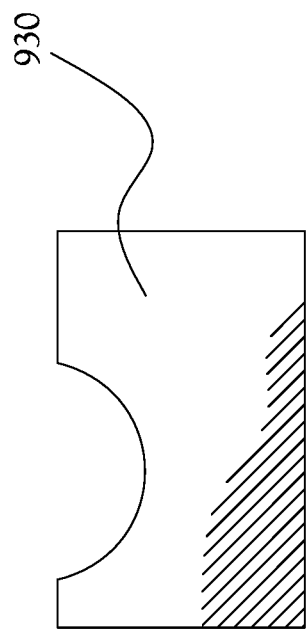
Fig.9c
Fig.9d

SYSTEMS AND METHODS OF RETROFITTING AN AIRCRAFT ENGINE TO AN AIRCRAFT

CROSS-REFERENCE TO RELATED APPLICATIONS

This application claims the benefit of U.S. Provisional Application No. 62/936,060, filed on Nov. 15, 2019, and is a continuation in part of U.S. application Ser. No. 16/846,877, filed on Apr. 13, 2020, the disclosures and Appendix of which are incorporated herein in their entirety by reference.

FIELD OF INVENTION

The present general inventive concept relates to an aircraft engine adapter system for retrofitting aircraft engines from one aircraft to another, and a method of retrofitting or converting engines on a turboprop aircraft.

BACKGROUND

Example embodiments of the present general inventive concept can provide an engine mount adapter assembly for use with an aircraft. As shown in the accompanying illustrations, drawings, and images, the engine mount adapter assembly is attached to brackets, which are affixed to a skeletal framework comprising of multiple tubular members joined together. A ring member adapter can be attached to the brackets on the skeletal framework, and mounting brackets are attached to the ring member adapter. In this way, the engine mount adapter assembly can function as an adapter to retrofit aircraft engines with either three mount attachment points or four or more mount attachment points. Embodiments of the present general inventive concept can be applied to retrofit any and all PT-6 series engines (e.g., T34, T65, and others) to any S2R type airplanes, although the embodiments are not limited to any particular type of engine or airplane.

Additional features and embodiments of the present general inventive concept will be set forth in part in the description which follows, and, in part, will be obvious from the description, or may be learned by practice of the present general inventive concept.

BRIEF SUMMARY OF THE INVENTION

Example embodiments of the present general inventive concept can be achieved by providing a system for retrofitting an aircraft engine to an aircraft including a circular member having a diametrical surface to receive an aircraft engine of a first aircraft, a plurality of longitudinal members each having a first end and a second end, means for securely attaching the first ends in a circumferentially spaced apart manner to the diametrical surface such that the second ends extend transversely from the circular member in a first direction, means for securely attaching the second ends to an inner portion of a second aircraft, wherein shape and size of the inner portion of the second aircraft is different than shape and size of a corresponding inner portion of the first aircraft, means for securely attaching a rear end of the aircraft engine to the diametrical surface such that a front end of the aircraft engine extends transversely from the diametrical surface opposite the first direction such that the aircraft engine of the first aircraft is securely mounted to the second aircraft suitable for approved flight.

The system can include means for retrofitting electrical, control, and fuel line connections of the second aircraft to mate the aircraft engine of the first aircraft.

Example embodiments of the present general inventive concept can also be achieved by providing an engine adapter for an aircraft, which adapts to a skeletal framework configured to support an aircraft engine of a first aircraft, one or more rear stiffeners attached to a rear end of the skeletal framework, one or more forward stiffeners attached to the front end of the skeletal framework, wherein the skeletal framework is configured for installation to a second aircraft to retrofit the engine of the first aircraft to the second aircraft, and the skeletal framework comprises multiple tubular members joined to the forward stiffeners at the front end of the skeletal framework and joined to the rear stiffeners at the rear end of the skeletal framework, and wherein the forward stiffeners attach to a ring member at the front end of the skeletal framework.

Further embodiments can provide methods of adapting an engine to an aircraft, comprising providing a skeletal framework including multiple tubular members configured to support an aircraft engine of a first aircraft, providing one or more rear stiffeners attached to a rear end of the skeletal framework, providing one or more forward stiffeners attached to the front end of the skeletal framework and to the fuselage of the aircraft, and wherein the skeletal framework is configured for installation to a second aircraft to retrofit the engine of the first aircraft to the second.

Example embodiments of the present general inventive concept can provide a method for converting engines on a turboprop aircraft, the method including removing an existing engine and associated propeller from the aircraft fuselage, installing a new or different engine and associated propeller in fuselage, transferring starting and generations systems, conforming instrument markings and placard to the Aircraft Flight Manual for Restricted Category Aircraft, altering the tubular structure of the engine mount of the newly transferred engine, transferring the propeller control linkage, transferring lord engine isolator mounts, transferring cowling basket, transferring cowl panels, recalibrating glass panel engine monitoring and annunciation systems, reconfiguring sensor system harnesses, transmitters, and connectors, removing emergency fuel pump, circuit breaker, switch, and placard, and isolating and securing wiring and connectors.

Example embodiments of the present general inventive concept may provide a system and method of converting engines on a turboprop aircraft, including removing an existing engine and associated propeller from an aircraft fuselage, installing an engine mount adapter assembly to the fuselage, and installing a replacement engine to the engine mount adapter assembly, whereby at least some portions of the replacement engine are attached to the engine mount adapter assembly for structural support.

Additional features and embodiments of the present general inventive concept will be set forth in part in the description which follows, and, in part, will be obvious from the description, or may be learned by practice of the present general inventive concept.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 9a illustrates a view of a support bracket according to example embodiments of the present general inventive concept;

FIG. 9b illustrates a view of a support bracket according to example embodiments of the present general inventive concept;

FIG. 9c illustrates a view of a support bracket according to example embodiments of the present general inventive concept;

s FIG. 9d illustrates a view of a support bracket according to example embodiments of the present general inventive concept;

DETAILED DESCRIPTION

Figure 1:
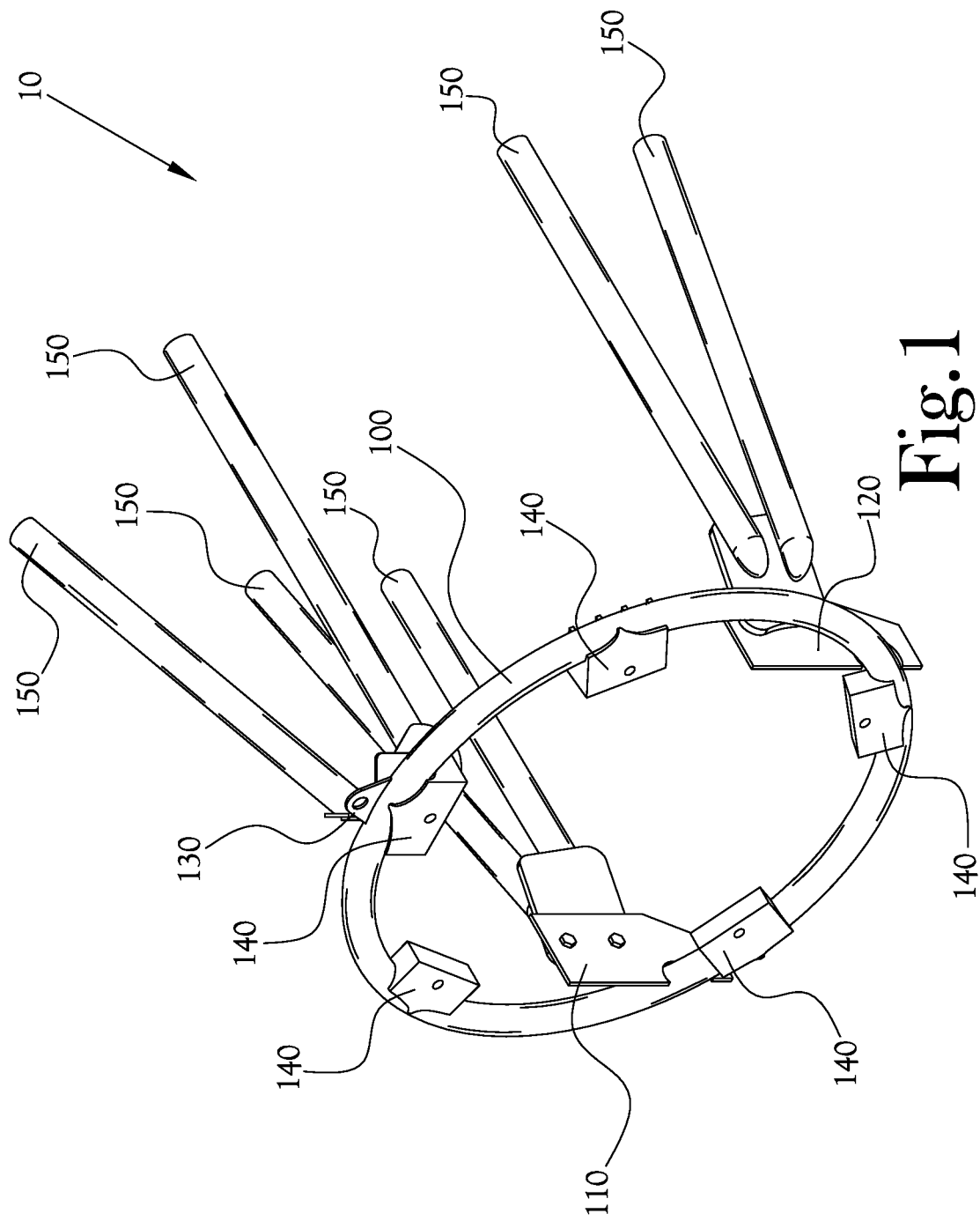
FIG. 1 illustrates a perspective view of an engine mount adapter assembly according to example embodiments of the present general inventive concept.

Reference will now be made to the example embodiments of the present general inventive concept, examples of which are illustrated in the accompanying drawing(s) and illustration(s). The example embodiments are described herein in order to explain the present general inventive concept by referring to the figure(s). The following detailed description is provided to assist the reader in gaining a comprehensive understanding of the structures described herein. Accordingly, various changes, modification, and equivalents of the structures and techniques described herein will be suggested to those of ordinary skill in the art. The descriptions are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to some embodiments of the present inventive concept, an engine mount adapter assembly is provided which can be used to retrofit a replacement engine to an airplane. For example, the Model S2R-H80-Thrush Aircraft can be retrofit with a various Pratt & Whitney PT6A turboprop engines using the engine mount adapter assembly. Embodiments of the present general inventive concept can be applied to retrofit any and all PT-6 series engines (e.g., T34, T65, and others) to any S2R-H80 type airplanes, although the embodiments are not limited to any particular type of engine or airplane.

Example configurations of the retrofitting system can be achieved by configuring the adaptor ring in size and shape to enable the altering the tubular structure of the engine mount of the newly transferred engine; transferring the propeller control linkage; transferring lord engine isolator mounts; transferring cowling basket; transferring cowl panels; recalibrating glass panel engine monitoring and annunciation systems; reconfiguring sensor system harnesses, transmitters, and connectors; removing emergency fuel pump, circuit breaker, switch, and placard; and isolating and securing wiring and connectors. Starting and generation systems transferred with engine and previous systems removed. Wiring and remaining wiring blanked off and isolated.

FIG. 1 illustrates an example system configured in accordance with embodiments of the present general inventive concept. An engine mount adapter assembly 10 according to example embodiments of the present general inventive concept. A main support device shown as a ring or circular member 100 in the figure includes a diametrical surface to support an aircraft engine in a secure manner as well as provide a mounting surface for various attachment and securement means for various forward and rear mounting stiffeners comprising brackets, and other parts of the aircraft including fuel lines, electronics, control systems, among other devices. Shown attached to the ring member 100 are various securement means which may include a left bracket assembly 110 and a right bracket assembly 120. These bracket assemblies 110 and 120 are configured to support the aircraft engine and provide a secure fitment, preventing excessive movement and vibration during use. Equivalent means may be provided to attach the components shown in manners known in the art, such as welding, bolting, fixturing, etc.

Also shown in the figure is means for attaching an aircraft engine including a top bracket assembly 130. The top bracket assembly 130 also provides an attachment point for the aircraft engine, although its configuration as shown in the figure is different from the left bracket assembly 110 and right bracket assembly 120. Shown connected to the bracket assemblies 110, 120, and 130 are multiple longitudinal, e.g., tubular members 150 which may join together to form a skeletal support structure. A plurality of mounting brackets 140 may function as means for supporting the aircraft engine to the ring member independent of the means for attaching the longitudinal members 150. The mounting bracket 140 may include fingers, as shown in the figure, which are configured to grip the ring member 100 and support the aircraft engine. The multiple longitudinal or tubular members 150 may join onto an inner surface of the fuselage of the aircraft at a rear end of the skeletal support structure by welding the distal ends of the tubular members 150 using suitable attachment means known in the art. One of ordinary skill in the art will recognize that the invention is not limited to the specific orientations and configurations illustrated in FIG. 1, and any number of equivalent configurations may also be possible using sound engineering judgement as known in the art, including various flanges, brackets, welds, bolts, plates, fixtures, etc.

Figure 2:
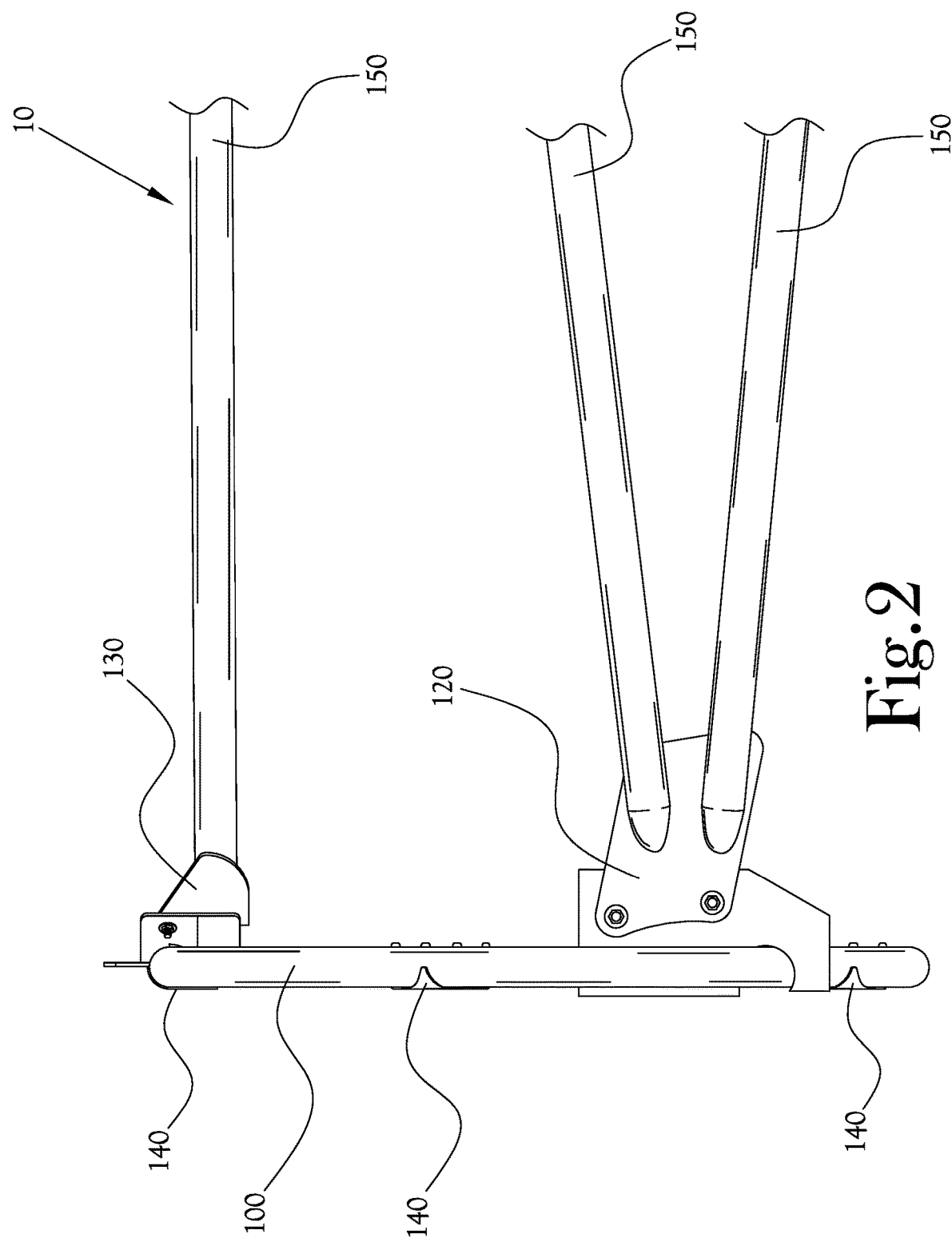
FIG. 2 illustrates a side view of the engine mount adapter assembly according to example embodiments of the present general inventive concept.

FIG. 2 illustrates a side view of the engine mount adapter assembly 10 according to example embodiments of the present general inventive concept. A main support device shown as a ring member 100 in the figure may enclose an aircraft engine in a supporting manner as well as provide attachment points for various brackets. Only the right bracket assembly 120 is visible in this view and is shown attached to tubular members 150 which may join together to form a skeletal support structure. A single mounting bracket 140 may also be attached to the ring member 100.

Figure 3:
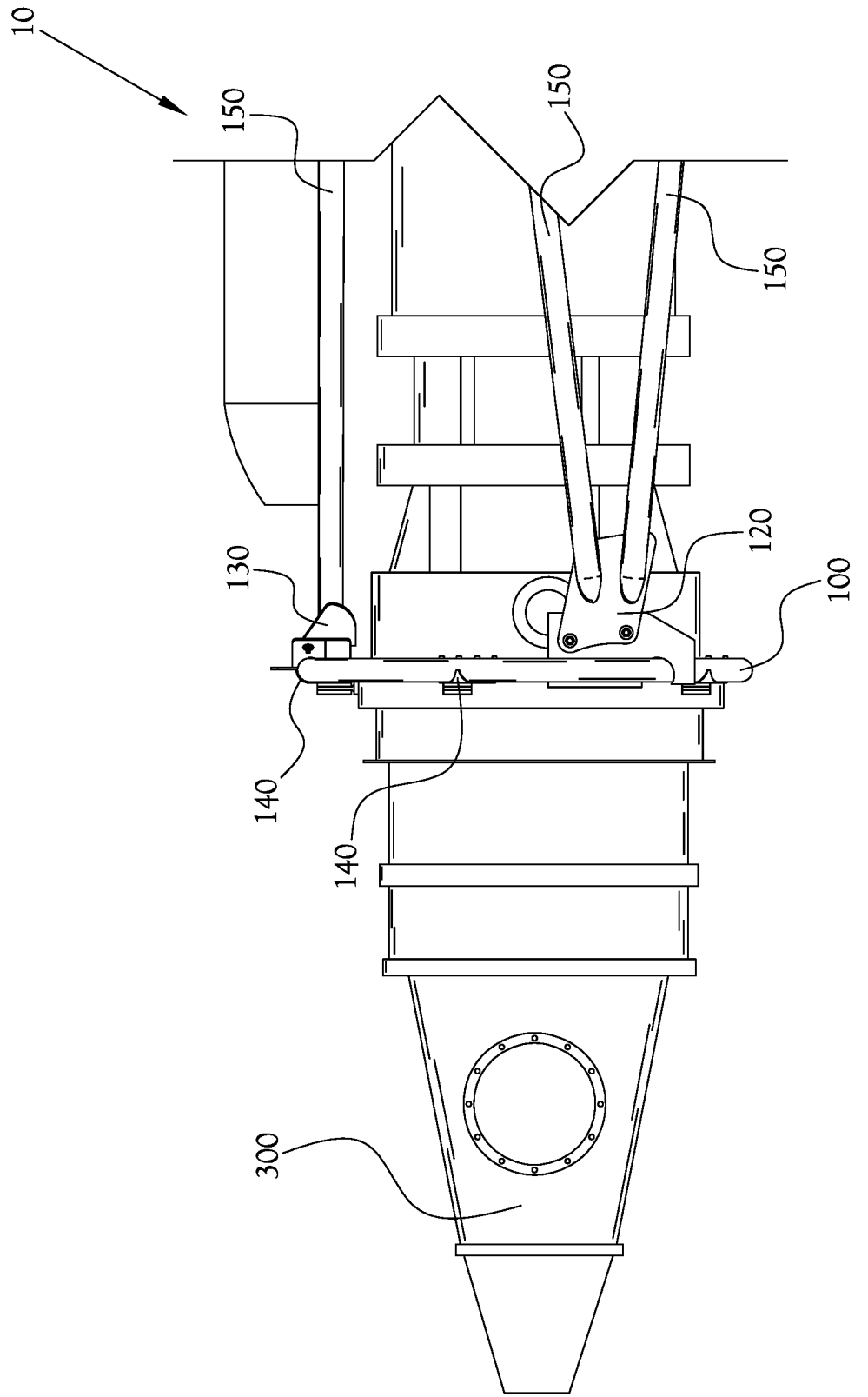
FIG. 3 illustrates a side view of the engine mount adapter assembly with engine according to example embodiments of the present general inventive concept.

Shown in FIG. 3 is a side view of the engine mount adapter assembly 10 with engine 300 attached according to example embodiments of the present general inventive concept. A main support device shown as a ring member 100 in the figure enclosing an aircraft engine in a supporting manner as well as provide attachment points for various brackets. Only the right bracket assembly 120 is visible in this view and is shown attached to tubular members 150 which may join together to form a skeletal support structure. A single mounting bracket 140 may also be attached to the ring member 100 and serves in the embodiment as an attachment point to the aircraft engine 300.

Figure 4:
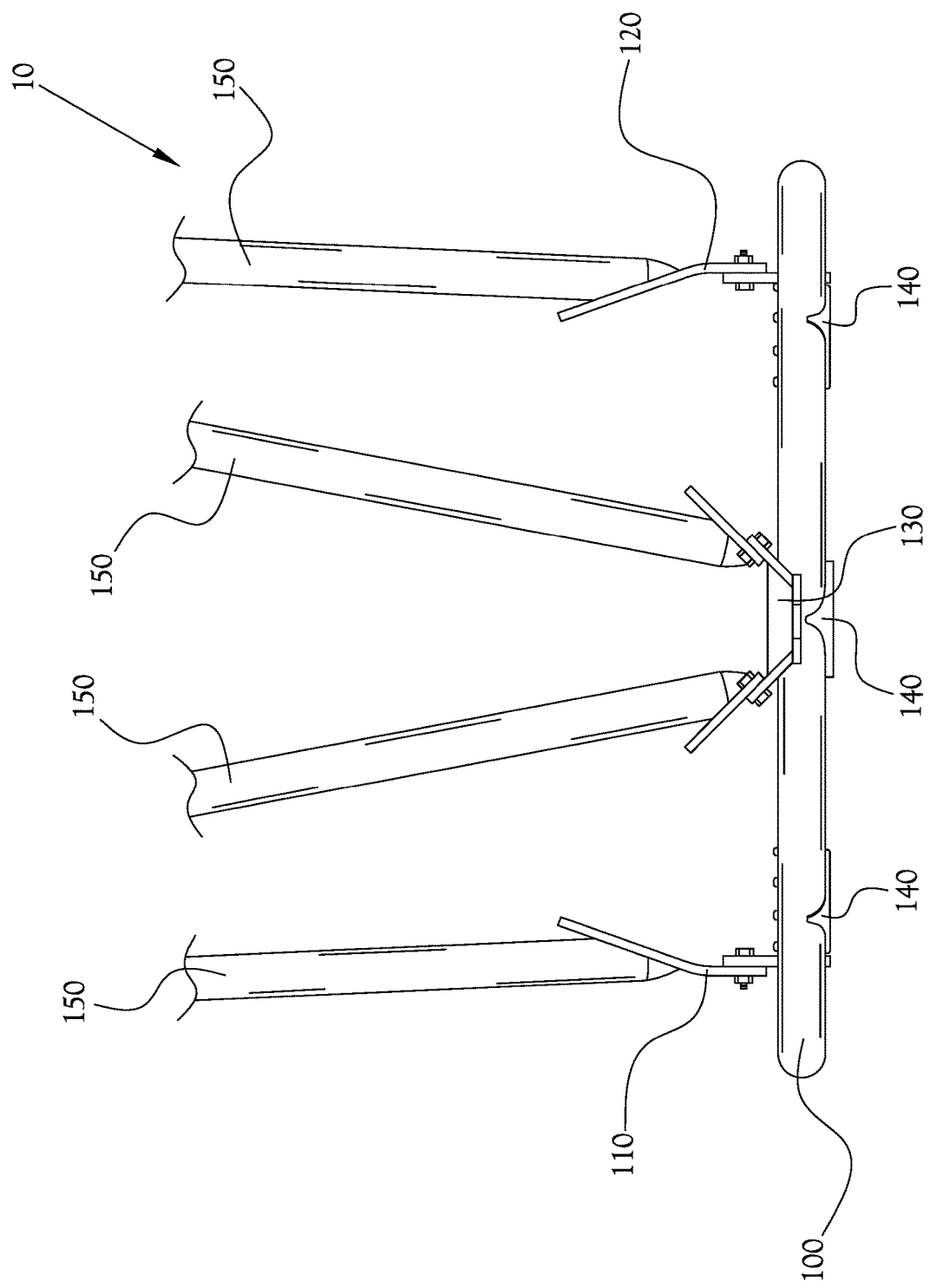
FIG. 4 illustrates a top view of the engine mount adapter assembly showing a ring member with multiple mount brackets attached to the ring member according to example embodiments of the present general inventive concept.

FIG. 4 illustrates a top view of the engine mount adapter assembly 10 according to example embodiments of the present general inventive concept. A main support device shown as a ring member 100 in the figure may enclose an aircraft engine in a supporting manner as well as provide attachment points for various brackets. Both the left bracket assembly 110 and right bracket assembly 120 are visible in this view and are shown attached to tubular members 150 which may join together to form a skeletal support structure.

Figure 5:
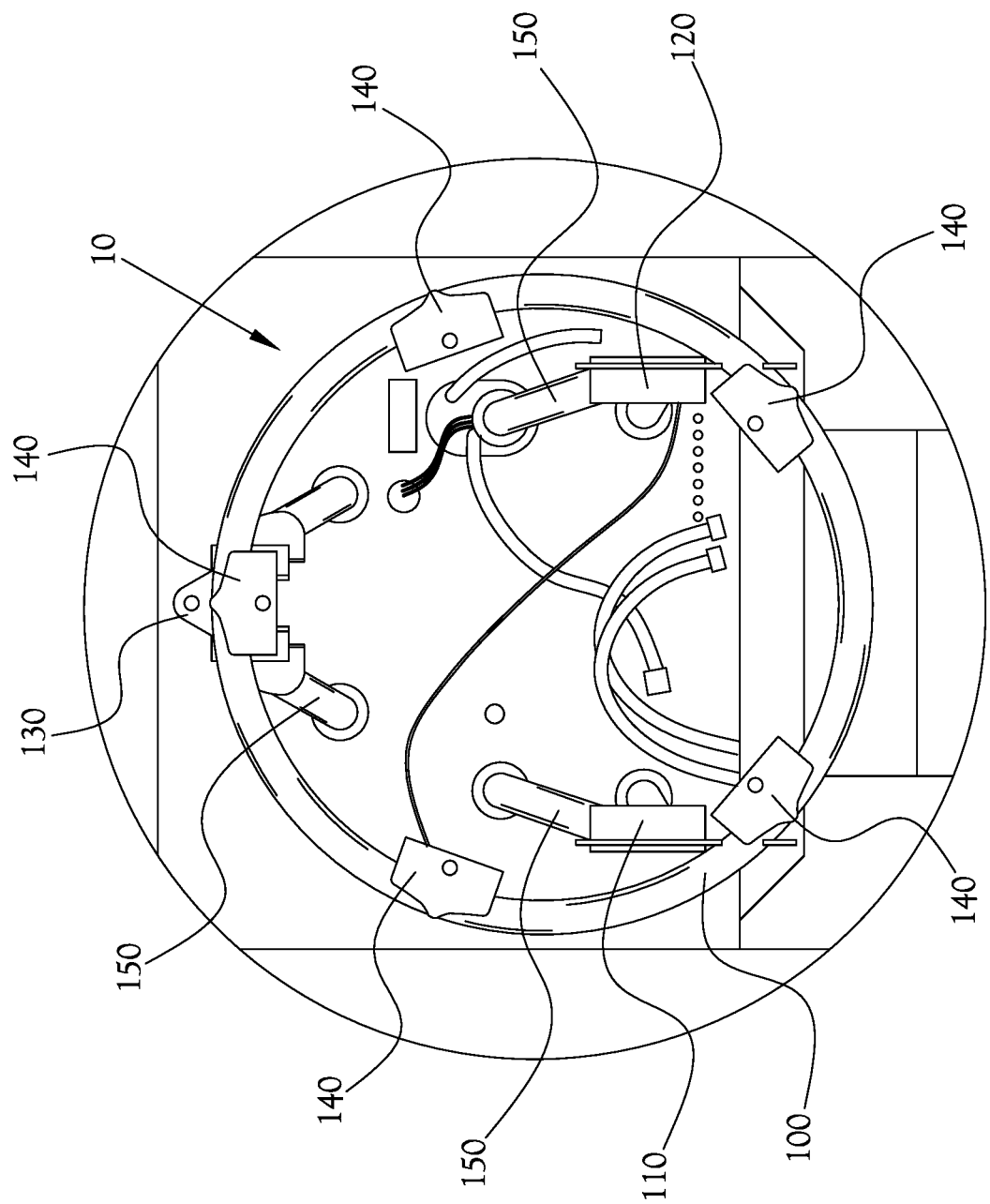
FIG. 5 illustrates a straight on view of the engine mount adapter assembly showing the engine mount adapter assembly attached to the engine of an aircraft according to example embodiments of the present general inventive concept.

FIG. 5 illustrates a straight on view of the engine mount adapter assembly 10 showing the engine mount adapter assembly attached to the engine of an aircraft according to example embodiments of the present general inventive concept. As illustrated in FIG. 5, example embodiments provide means for retrofitting various electronic control systems such that the electronic control systems of the aircraft are made compatible with the retrofitted engine, and means for certifying that the retrofit complies with airworthiness standards. For example, the electrical, control, and fuel line connections of the second aircraft can be configured to mate with the aircraft engine componentry of the first aircraft. A main support device shown as a ring member 100 in the figure may enclose an aircraft engine in a supporting manner as well as provide attachment points for various brackets and other parts of the aircraft including fuel lines, electronics, control systems, among other devices. Shown attached to the ring member 100 FIG. 1 is a left bracket assembly 110 and a right bracket assembly 120. These bracket assemblies 110 and 120 support the aircraft engine and provide a secure fitment, preventing excessive movement and vibration during use. Also shown is a top bracket assembly 130. The top bracket assembly 130 also provides an attachment point for the aircraft engine, although its configuration as shown in the figure is different from the left bracket assembly 110 and right bracket assembly 120. Shown connected to the bracket assemblies 110, 120, and 130 are multiple tubular members 150 which may join together to form a skeletal support structure. A single mounting bracket 140 may function to support the aircraft engine without attachment to the tubular members 150 and skeletal support structure. Also shown in the figure are various other aircraft components including the fuel lines, electronics, control systems, as mentioned above. The engine mount adapter assembly 10 may serve to support and stabilize the various other aircraft components.

Figure 6B:
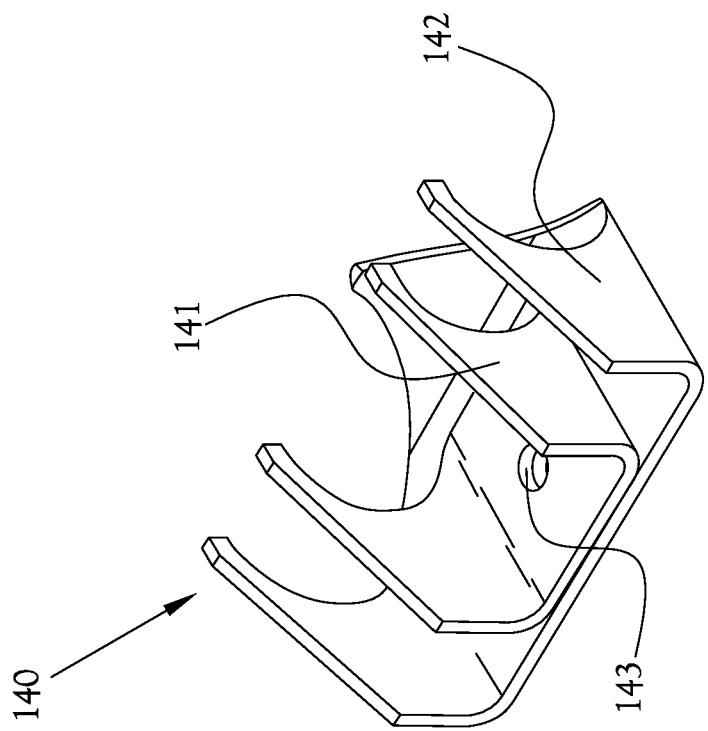
FIG. 6B illustrates a perspective view of a pair of support brackets according to example embodiments of the present general inventive concept.
Figure 6A:
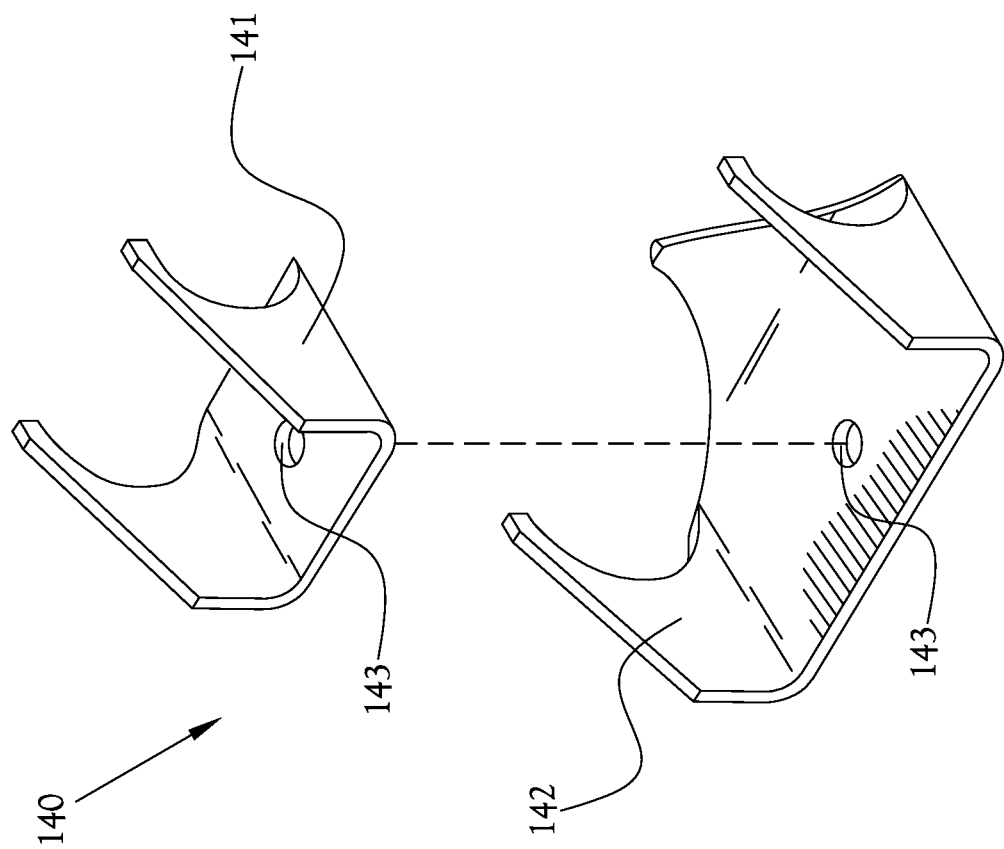
FIG. 6A illustrates a perspective view of a pair of support brackets integrally formed according to example embodiments of the present general inventive concept.

FIG. 6A illustrates a perspective view of a pair of support brackets according to example embodiments of the present general inventive concept. In the figure, a smaller support bracket 141 is shown with a larger support bracket 142 with a central attachment point 143 illustrated as a hole in the center of each support bracket. By attaching the smaller support bracket 141 with the larger support bracket 142 at the central attachment point 143 a more structural secure and rigid bracket may be realized, which can be used to support the weight of an aircraft engine. FIG. 6A illustrates a perspective view of the pair of support brackets integrally formed into the single mounting bracket 140, according to example embodiments of the present general inventive concept. In one embodiment, the smaller support bracket 141 and larger support bracket 142 may be welded together, such as by TIG welding, although other attachment means and devices, known in the art, may be used.

Figure 7:
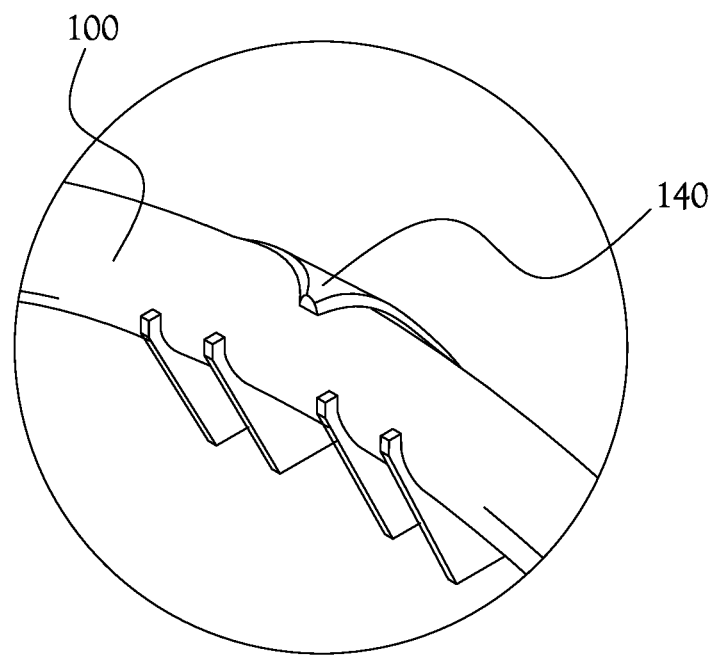
FIG. 7 illustrates a close up view of a pair of support brackets supporting a ring member according to example embodiments of the present general inventive concept.

FIG. 7 illustrates a close up view of a single mounting bracket 140 supporting a ring member 100 according to example embodiments of the present general inventive concept.

Figure 8:
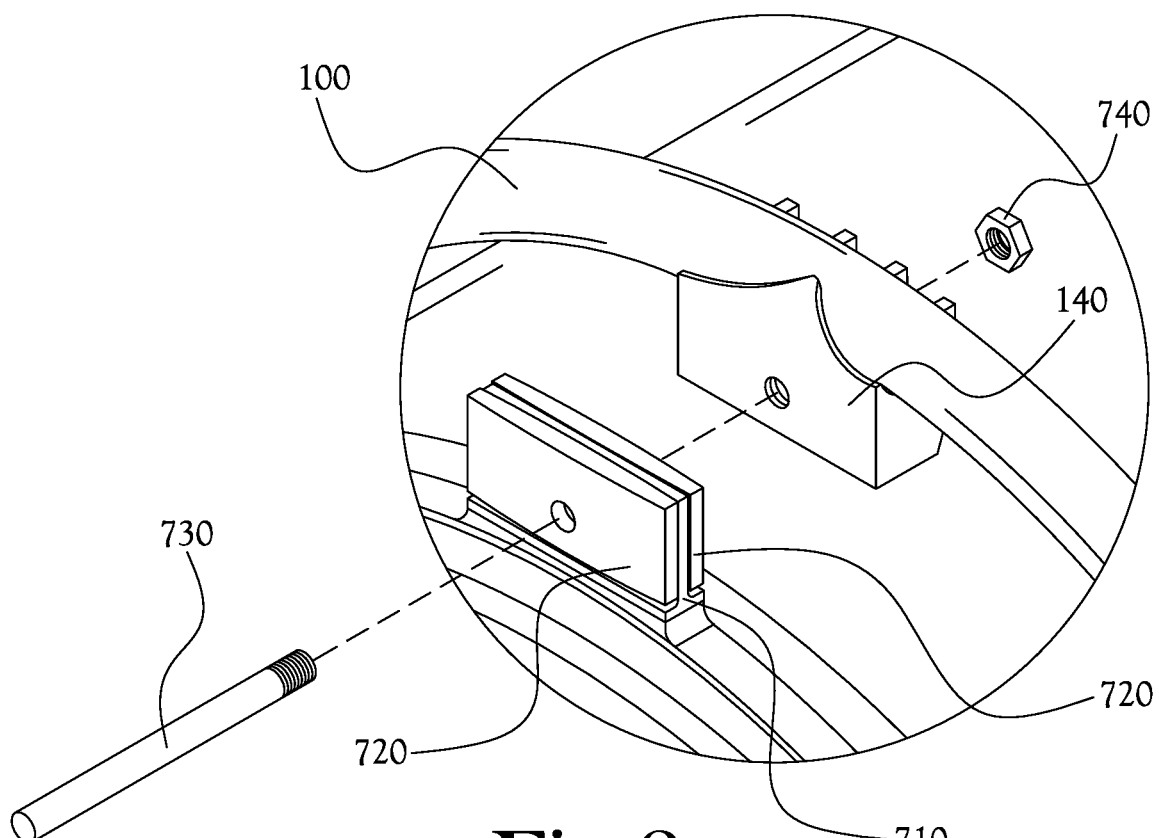
FIG. 8 illustrates a close up view of a pair of support brackets attaching to the engine of an aircraft according to example embodiments of the present general inventive concept.

FIG. 8 illustrates a close up view of a single mounting bracket 140 attaching to the engine of an aircraft according to example embodiments of the present general inventive concept. A T-square brace 710 integral to the aircraft engine and circumferentially spaced on the engine for mounting purposes is shown between two boots 720. The boots 720 may be made of rubber, plastic, or other materials which may have vibration and sound dampening properties. The T-square brace 710 and boot 720 assembly may be attached to the single mounting bracket 140 at the central attachment point 143 and joined together by a nut 740 and bolt 730 attachment assembly or other attachment means known in the art.

Illustrated in FIGS. 9a-9c are various support brackets which may be used as part of the engine mount adapter assembly 10. FIG. 9a illustrates a view of a support bracket 910 with a semicircular groove mateable with the circular cross section of the ring member 100. FIG. 9b illustrates a view of a support bracket 920 which a semicircular shape mateable with part of the circumference of the ring member 100. FIG. 9c illustrates a view of a support bracket 930 with a semicircular groove mateable with the circular cross section of the ring member 100. FIG. 9d illustrates a view of a support bracket 940 which may be in the shape of a trapezoid. The support bracket 940 may be attached at one end to the ring member 100 and to the tubular members 150 at the other. Additionally, the support bracket 940 may be used to attach the tubular members 150 to the fuselage of the aircraft at the rear end of the skeletal support structure. Moreover, the embodiments are not limited to those brackets shown in FIGS. 9a-9c and may utilize other bracket shapes and designs to attach the tubular members 150 to the front end of the engine mount adapter assembly 10 and the rear end, towards the aircraft fuselage.

As illustrated and describe herein, example embodiments of the present general inventive concept can be achieved by providing a system for retrofitting an aircraft engine to an aircraft including a circular member having a diametrical surface to receive an aircraft engine of a first aircraft, a plurality of longitudinal members each having a first end and a second end, means for securely attaching the first ends in a circumferentially spaced apart manner to the diametrical surface such that the second ends extend transversely from the circular member in a first direction, means for securely attaching the second ends to an inner portion of a second aircraft, wherein shape and size of the inner portion of the second aircraft is different than shape and size of a corresponding inner portion of the first aircraft, means for securely attaching a rear end of the aircraft engine to the diametrical surface such that a front end of the aircraft engine extends transversely from the diametrical surface opposite the first direction such that the aircraft engine of the first aircraft is securely mounted to the second aircraft suitable for approved flight.

The system can include means for retrofitting electrical, control, and fuel line connections of the second aircraft to mate the aircraft engine of the first aircraft.

One of ordinary skill in the art would appreciate that the referenced dimensions and features shown are not intended to be limiting, but are given as examples to describe some, but not all, possible embodiments of the present inventive concept. Various additional dimensions, components and features could be chosen using sound engineering judgement to achieve the same or similar results. Such devices and methods can provide an adapter to install (or retrofit) in an aircraft an engine that was not originally provided during manufacture, thus effectively eliminating the need to provide a costly custom fit for each such aircraft. Such a device/system increases efficiency while also lowering cost.

Various example embodiments of the present general inventive concept may also provide a method of converting engines on a turboprop aircraft, various embodiments of which may use at least some of the components already described. For example, according to one example embodiment of the present general inventive concept, a process or method is provided which can be used to retrofit a replacement engine to an airplane. For example, as described herein, the Model S2R-H80—Thrush Aircraft can be retrofitted with a Pratt 86 Whitney PT6A turboprop engine using this novel approach. It is noted that while the retrofitting of the Model S2R-H80 to use the Pratt 86 Whitney PT6A engine is described here, this is merely one example embodiment of the conversion method enabled by the present general inventive concept. Various other aircraft engine conversions may be done without departing from the scope of the present general inventive concept.

In this example embodiment, means are provided to retrofit an aircraft designed to use a General Electric H80-100 series engine such that the aircraft can receive the Pratt Whitney PT6A-45R engine being installed on the aircraft. However, those skilled in the art will appreciate that a host of other PT6 series engines could be installed on the aircraft in a similar manner using the same or equivalent means. In this example embodiment, a General Electric GE H80-IOO engine, S/N 154012, with Hartzell Propeller HC-B4TW-3/T10282N, S/N QVA-95 was removed from the aircraft which is being converted, and a Pratt and Whitney PT6A-45R QEC engine, S/N PCE-84300, with Hartzell Propeller HC-B5MP-3C/M 1 0876ANS, S/N EVA2606 was installed as a replacement. The starting and generation systems were transferred to the aircraft along with the replacement engine, and the corresponding previous systems were removed. In various example embodiments, means are provided to blank off and isolate any remaining wiring associated with the replaced engine. The installation of the replacement engine is accomplished per existing manufacturer's AMM instructions. During the replacement or conversion process, instrument markings and placards are conformed to the S2R-T45 Dual Cockpit Aircraft Flight Manual for Restricted Category Aircraft, FAA Approved Apr. 20, 1990, and TCDS A4SW, Rev 38. In various example embodiments of the present general inventive concept, any and all Pratt and Whitney PT-6 series engines can be used on, and/or to retrofit, any of the S2R airplanes, e.g., T34, T65, and others.

If applicable, a Supplemental Data Plate may be created and installed directly below the Aircraft OEM Data Plate of the aircraft being converted, such as Engine n*6A-45R and Propeller HC-B5MP-3C. In this example embodiment, a new Hartzell Propeller was installed. During the conversion, the P-3 Heater Switch was removed and remaining hole was plugged, the placard was removed and switched, and the wiring and engine harness connector was isolated and secured. All Cowl Panels were transferred, utilizing existing camlocs and receptacles for attachment. The existing MVP-50T Glass Panel Engine Monitoring and Annunciation System was recalibrated to the PT6A-45R engine installation Limitations by OEM, Electronics International, Inc., referencing the AFM Limitations Section. The MVP-50T sensor system harnesses, transmitters, and connectors were reconfigured per Electronics International, Inc., with the instructions and wiring schematics aligning with the PT6A-45R installation. Placards were removed, added, or updated as required per same. The Emergency Fuel Pump, circuit breaker, switch, and placard were removed. wiring and connectors were isolated and secured.

In this example embodiment, all removals and installations were completed utilizing the applicable Manufacturer's Aircraft Maintenance Manuals (AFM). The AFM was replaced with the S2R-T45 Dual Cockpit Aircraft Flight Manual for Restricted Category Aircraft, FAA Approved Apr. 20, 1990. and TCDS A4SW, Rev 38. The Aircraft Flight Manual Supplements were transferred to the replacement AFM. Referencing TCDS A4SW, Rev 38, AFM, and applicable AMMs, Flight Control Travel Limits required no change, and the fore and aft CG Limits were re-established per same. Referencing conforming to Model S2R-T45 the following is required per Thrush Aircraft, Inc.: S2R-T45 Servicing Instructions.

Airframe and Engine maintenance is to be carried out in accordance with the following:
Airframe—Thrush Aircarft Incorporated Model S2R-T15 & S2R-T34 Maintenance Manual Part Number T15/T34-2, Issued 25 Oct. 1990, and revised on 24 Jul. 1991, or later Approved revision.
Engine—Section 4 of Thrush Aircraft Incorporated Model S2RHG-T65 Maintenance Manual Part Number T65HG-2, Issued May 5, 2004 & Revised Sep. 16, 2005, or later approved revision.

Additionally, IPC Document No. 00-50-001 and AMM Manual #H80-1MM will be referenced when conducting originally installed Airframe and/or System specific maintenance and/or replacements. The Equipment List updated per engine conversion. Additionally, the aircraft will be weighed, and the new Weight and Balance established and recorded in applicable aircraft records. Instructions for Continued Airworthiness (ICA) are found in and are to be maintained and continued per the airframe, engine, and propeller manufacturer's current and as revised applicable service documents. In this example embodiment, after the replacement engine was installed, the aircraft was aircraft ground run, and the leak and operational checked, with all results found to be satisfactory. The operations performed in various example embodiments of the present general inventive concept can retrofit in an aircraft an engine that was not originally provided during manufacture in a streamlined and cost effective manner. Such operations increase efficiency, while also lowering cost.

Figure 10:
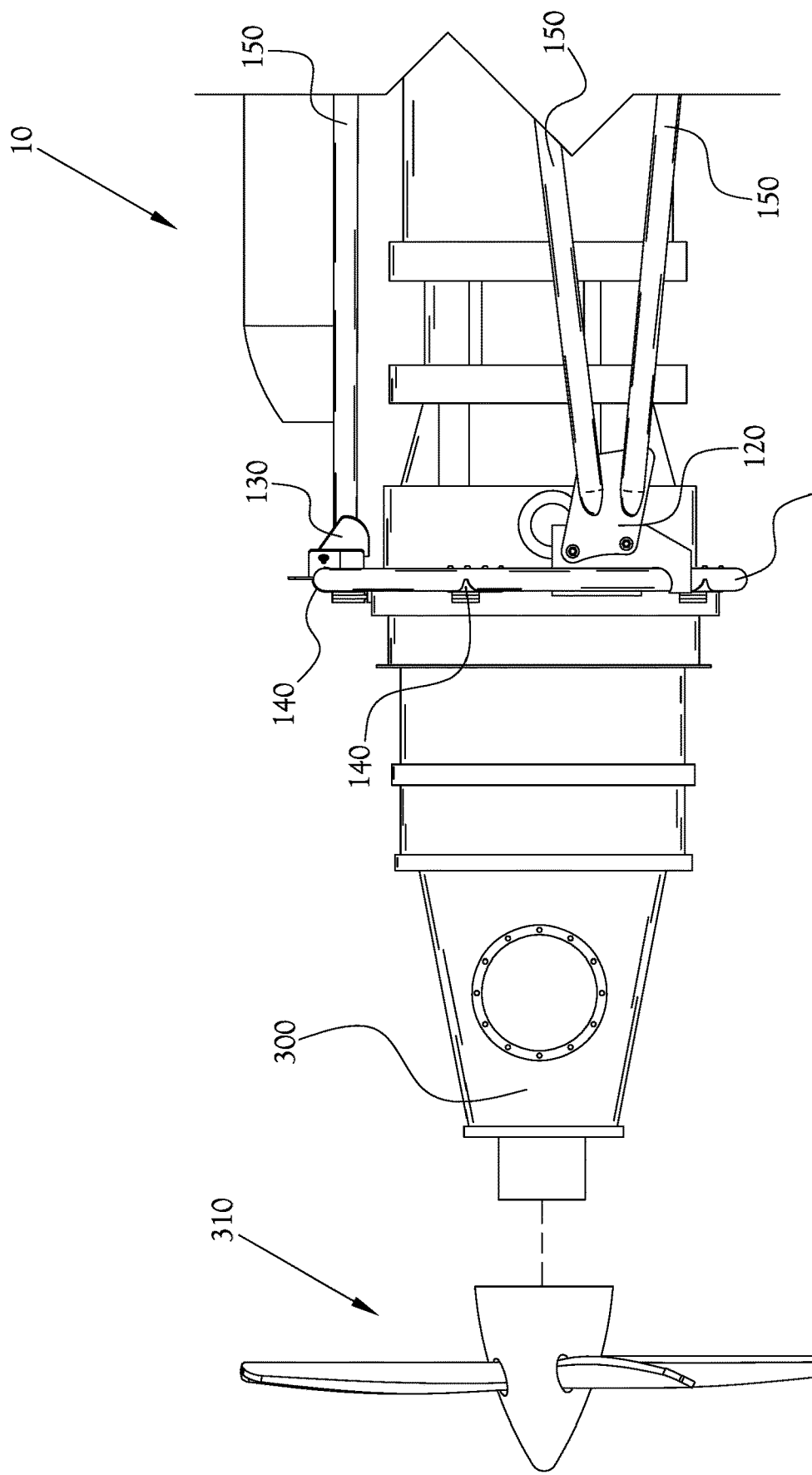
FIG. 10 illustrates an operation included in a method of converting an engine on a turboprop aircraft according to an example embodiment of the present general inventive concept.

FIG. 10 illustrates an operation included in a method of converting an engine on a turboprop aircraft according to an example embodiment of the present general inventive concept. Several operations, including attaching the engine mount adapter assembly 10 to the plane, and attaching the replacement engine 300 to the adapter assembly 10, have already been performed, and FIG. 10 illustrates the attachment of the propeller assembly 310 to the engine 300.

Figure 11:
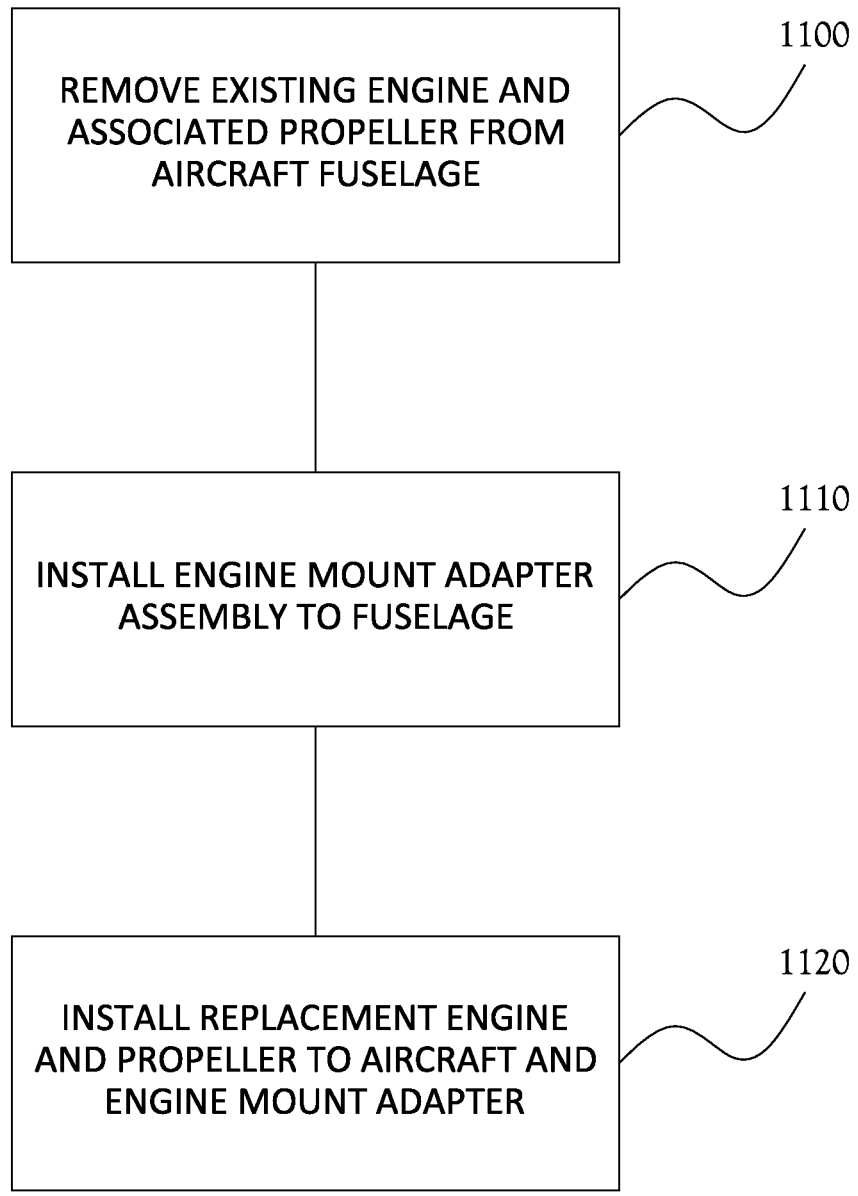
FIG. 11 is a flow chart illustrating various operations included in a method of converting an engine on a turboprop aircraft according to an example embodiment of the present general inventive concept.

FIG. 11 is a flow chart illustrating various operations included in a method of converting an engine on a turboprop aircraft according to an example embodiment of the present general inventive concept. In operation 1100 the existing engine and associated propeller is removed from the aircraft fuselage, taking care to not damage wiring connections, harnesses, etc., that may be used with the replacement engine. In operation 1110 the engine mount adapter assembly is attached to various attachment points of the aircraft. In operation 1120 the replacement engine is installed to the aircraft, and the corresponding propeller assembly is attached to the replacement engine. The installation of the engine includes at least some structural connections between the engine and the engine mount adapter, and various wiring connections and/or reconfigurations are made during or after the mounting process in some example embodiments.

Various example embodiments of the present general inventive concept may provide a method of converting engines on a turboprop aircraft, the method including removing an existing engine and associated propeller from an aircraft fuselage, installing an engine mount adapter assembly to the fuselage, and installing a replacement engine to the engine mount adapter assembly, whereby at least some portions of the replacement engine are attached to the engine mount adapter assembly for structural support. The method may further include attaching an associated propeller to the replacement engine. The method may further include transferring, altering, and installing starting and generation systems associated with the replacement engine. The method may further include conforming instrument markings and placard to a flight manual associated with the aircraft. The method may further include transferring a propeller control linkage for the replacement engine. The method may further include transferring associated engine isolator mounts for the replacement engine. The method may further include transferring cowl panels for the replacement engine. The method may further include recalibrating glass panel engine monitoring and annunciation systems for the aircraft. The method may further include reconfiguring sensor system harnesses, transmitters, and connectors to correspond to the replacement engine. The method may further include isolating and securing wiring and connectors associated with the replacement engine. The existing engine may be a General Electric H80-100/H85 series, and the replacement engine may be a Pratt Whitney PT6A-45R. In various example embodiments the existing engine may be a General Electric H80-100/H85 series, and the replacement engine may be any PT6 series engine. The method may further include forming the engine mount adapter assembly so as to be configured to fit the aircraft and the replacement engine. The method may further include establishing new weight and balance of aircraft with the replacement engine, and recording the new weight and balance in applicable aircraft records.

Various example embodiments of the present general inventive concept may provide a system for converting engines on a turboprop aircraft, the system including adapter means configured to mount a replacement engine to an aircraft, whereby at least some portions of the replacement engine are attached to the adapter means for structural support. An example of such adapter means is illustrated by the engine mount adapter assembly 10 of FIG. 1. However, it is understood that the present general inventive concept is not limited to such an assembly, and various other means or equivalents thereof may be fabricated and/or used according to sound engineering judgment and principles to carry out or accomplish the function of retrofitting an engine to an aircraft. For example, the system may further include various means for transferring, altering, and installing starting and generation systems associated with the replacement engine. The system may further include means for conforming instrument markings and placard to a flight manual associated with the aircraft, for example, as illustrated and described in Appendix A incorporated by reference herein. The system may further include means for establishing new weight and balance of aircraft with the replacement engine, and recording the new weight and balance in applicable aircraft records. The system may further include means for recalibrating glass panel engine monitoring and annunciation systems for the aircraft. The system may further include means for reconfiguring sensor system harnesses, transmitters, and connectors to correspond to the replacement engine.

While there have been described what are considered to be preferred embodiments of the present invention, it will be readily appreciated by those skilled in the art that modifications can be made without departing from the scope of the teachings herein. Numerous variations, modification, and additional embodiments are possible, and, accordingly, all such variations, modifications, and embodiments are to be regarded as being within the spirit and scope of the present general inventive concept.

The present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. In a turboprop aircraft having a turboprop engine of a first type and wherein said turboprop aircraft is not adapted for a turboprop engine of a second type, a method of for retrofitting said turboprop engine of said second type into said turboprop aircraft, said turboprop aircraft further having a propeller, and a fuselage, the method comprising:
removing said engine of said first type and said propeller from said turboprop aircraft;
installing a retrofit engine mount adapter assembly to said fuselage of said turboprop aircraft; and
installing said turboprop engine of said second type to said engine mount adapter assembly, whereby at least some portions of said turboprop engine of said second type are attached to said engine mount adapter assembly for structural support.

2. The method of claim 1, further comprising attaching an associated propeller to said turboprop engine of said second type.

3. The method of claim 1, further comprising transferring, altering, and installing starting and generation systems associated with said turboprop engine of said second type.

4. The method of claim 1, further comprising conforming instrument markings and placard to a flight manual associated with said turboprop aircraft.

5. The method of claim 1, further comprising transferring a propeller control linkage for said turboprop engine of said second type.

6. The method of claim 1, further comprising transferring associated engine isolator mounts for said turboprop engine of said second type.

7. The method of claim 1, further comprising transferring cowl panels for said turboprop engine of said second type.

8. The method of claim 1, further comprising recalibrating glass panel engine monitoring and annunciation systems for said turboprop aircraft.

9. The method of claim 1, further comprising reconfiguring sensor system harnesses, transmitters, and connectors to correspond to said turboprop engine of said second type.

10. The method of claim 1, further comprising isolating and securing wiring and connectors associated with said turboprop engine of said second type.

11. The method of claim 1, further comprising forming the engine mount adapter assembly so as to be configured to fit said turboprop aircraft and said turboprop engine of said second type.

12. The method of claim 1, further comprising establishing new weight and balance of said turboprop aircraft with said turboprop engine of said second type and recording the new weight and balance in records of said turboprop aircraft.

13. The method of claim 1, wherein said retrofit engine mount adapter assembly includes a skeletal framework including multiple tubular members configured and adapted to support said turboprop engine of said second type wherein said skeletal framework including:

a circular member having a diametrical surface to receive said turboprop engine of said second type;
a plurality of longitudinal members each having a first end and a second end;
at least one attachment member defined by a mounting bracket for attaching the longitudinal members to the circular member wherein said at least one mounting bracket has a plurality of fingers which are configured to grip the circular member and support the turboprop engine of the second type;
at least one further attachment member adapted to attach the second ends of said plurality of longitudinal members to an inner portion of said turboprop aircraft; and
at least one attachment member adapted to attach a rear end of the turboprop engine of the second type to the diametrical surface of the circular member such that a front end of the turboprop engine of the second type extends transversely from the diametrical surface opposite the first direction such that the engine of the second type is mounted to the aircraft.

14. In a turboprop aircraft having a turboprop engine of a first type and wherein said turboprop aircraft is not adapted for a turboprop engine of a second type, a method for retrofitting said turboprop engine of said second type into said turboprop aircraft, said turboprop aircraft further having a propeller, and a fuselage, the method comprising:
removing said engine of said first type and said propeller from said turboprop aircraft;
installing a retrofit engine mount adapter assembly to said fuselage of said turboprop aircraft, said retrofit engine mount adapter assembly having a skeletal framework including multiple tubular members configured and adapted to support said turboprop engine of said second type; and
installing said turboprop engine of said second type to said engine mount adapter assembly, whereby at least some portions of said turboprop engine of said second type are attached to said retrofit engine mount adapter assembly for structural support;
wherein said skeletal framework of said retrofit engine mount adapter includes:
a circular member having a diametrical surface to receive said turboprop engine of said second type;
a plurality of longitudinal members each having a first end and a second end;
at least one attachment member defined by a mounting bracket for attaching the longitudinal members to the circular member wherein said at least one mounting bracket has a plurality of fingers which are configured to grip the circular member and support the turboprop engine of the second type;
at least one further attachment member adapted to attach the second ends of said plurality of longitudinal members to an inner portion of said turboprop aircraft; and
at least one attachment member adapted to attach a rear end of the turboprop engine of the second type to the diametrical surface of the circular member such that a front end of the turboprop engine of the second type extends transversely from the diametrical surface opposite the first direction such that the engine of the second type is mounted to the aircraft.

* * * * *